(12) United States Patent
Yoshikawa et al.

(10) Patent No.: US 8,924,059 B2
(45) Date of Patent: Dec. 30, 2014

(54) ELECTRONIC CONTROL DEVICE AND VEHICLE CONTROL SYSTEM

(75) Inventors: Taku Yoshikawa, Shioya-gun (JP); Takeshi Yamada, Tokyo (JP); Shinichi Daibo, Utsunomiya (JP); Yuichi Kobata, Utsunomiya (JP)

(73) Assignees: Keihin Corporation (JP); Honda Motor Co., Ltd. (JP)

( * ) Notice: Subject to any disclaimer, the term of this patent is extended or adjusted under 35 U.S.C. 154(b) by 0 days.

(21) Appl. No.: 13/599,095

(22) Filed: Aug. 30, 2012

(65) Prior Publication Data

US 2013/0231807 A1 Sep. 5, 2013

(30) Foreign Application Priority Data

Sep. 14, 2011 (JP) ................ P2011-200759

(51) Int. Cl.
*G06F 7/00* (2006.01)
*B60L 11/18* (2006.01)
*B60L 3/00* (2006.01)
*B60L 11/14* (2006.01)
*G05B 19/02* (2006.01)

(52) U.S. Cl.
CPC ............ *G05B 19/02* (2013.01); *B60L 11/1864* (2013.01); *B60L 11/1803* (2013.01); *Y02T 10/7005* (2013.01); *B60L 3/0023* (2013.01); *B60L 11/14* (2013.01); *B60L 2240/80* (2013.01); *B60L 11/1816* (2013.01); *Y02T 10/7241* (2013.01); *B60L 11/1861* (2013.01); *B60L 2210/40* (2013.01)
USPC .......................................................... 701/22

(58) Field of Classification Search
USPC ............ 701/22, 36, 53, 31; 714/47.1, 23, 41, 714/51, 55; 700/79–82; 713/323; 340/3.1, 340/3.42

See application file for complete search history.

(56) References Cited

U.S. PATENT DOCUMENTS

| | | | | |
|---|---|---|---|---|
| 5,602,493 A | * | 2/1997 | Konishi et al. | 326/33 |
| 2003/0079163 A1 | * | 4/2003 | Hashimoto et al. | 714/55 |
| 2004/0225831 A1 | * | 11/2004 | Pail et al. | 711/105 |
| 2007/0100573 A1 | * | 5/2007 | Ueno et al. | 702/117 |
| 2009/0030587 A1 | * | 1/2009 | Yonezawa et al. | 701/103 |
| 2009/0251103 A1 | * | 10/2009 | Yamamoto et al. | 320/133 |
| 2011/0140669 A1 | * | 6/2011 | Murakami et al. | 320/134 |
| 2012/0011407 A1 | * | 1/2012 | Fuchigami | 714/39 |

FOREIGN PATENT DOCUMENTS

JP 8-142794 A 6/1996

* cited by examiner

*Primary Examiner* — Mary Cheung
*Assistant Examiner* — Rodney Butler
(74) *Attorney, Agent, or Firm* — Cantor Colburn LLP (57) ABSTRACT

The present invention provides an electronic control device including: a processing unit having a function of transition to a sleep mode; and a watch dog timer having a time counter that resets in response to a pulse signal outputted from the processing unit at certain intervals, this watch dog timer outputting a signal having a level inverted according to the existence or absence of overflow occurrence, in which the electronic control device further includes a latch circuit that latches the signal outputted from the watch dog timer and outputs a signal obtained through the latching as a first output enable signal, and the processing unit stops outputting the pulse signal before transition to the sleep mode, and carries out failure diagnosis of the watch dog timer based on the first output enable signal outputted from the latch circuit after output of the pulse signal is stopped.

5 Claims, 5 Drawing Sheets

ELECTRONIC CONTROL DEVICE AND VEHICLE CONTROL SYSTEM

BACKGROUND OF THE INVENTION

The present invention relates to an electronic control device and a vehicle control system.

The present application claims priority based on Japanese Patent Application No. 2011-200759 filed in Japan on Sep. 14, 2011, the disclosures of which are incorporated herein by reference in their entirety.

FIELD OF THE INVENTION

As is well known, a watch dog timer (WDT) serves as a hardware timer used for monitoring states of a central processing unit (CPU). The CPU usually updates the WDT at certain intervals. When the CPU does not update within a certain period of time, the WDT detects timeout, and outputs an error. If this WDT breaks down, the error in CPU cannot be detected, and hence, there is a possibility that the reliability of a system is difficult to maintain.

Japanese Unexamined Patent Application, First Publication No. H08-142794 discloses a technique in which the CPU itself causes a program runaway immediately after electric power is supplied, and determines whether the CPU receives a reset signal from a runaway detection circuit (WDT) within a predetermined period of time after the occurrence of the program runaway, thereby carrying out failure diagnosis for the WDT.

DESCRIPTION OF THE RELATED ART

The above-described related art carries out the failure diagnosis for the WDT at the time of startup of the CPU. However, if this technique is applied to a system having a CPU with relatively high frequency of startup and sleep modes, each startup of the CPU takes a longer time, possibly having an adverse effect on the reliability of the system.

The present invention has been made in view of the circumstances described above, and an object of the present invention is to carry out failure diagnosis of the WDT without causing delays in starting up a processing unit such as a CPU to be monitored.

SUMMARY OF THE INVENTION

The present invention employs the following configuration to solve the above problems.

(1) A first aspect of the present invention provides an electronic control device including: a processing unit having a function of transition to a sleep mode; and a watch dog timer having a time counter that resets in response to a pulse signal outputted from the processing unit at certain intervals, this watch dog timer outputting a signal having a level inverted according to the existence or absence of overflow occurrence, in which the electronic control device further includes a latch circuit that latches the signal outputted from the watch dog timer and outputs a signal obtained through the latching as a first output enable signal, and the processing unit stops outputting the pulse signal before transition to the sleep mode, and carries out failure diagnosis of the watch dog timer on the basis of the first output enable signal outputted from the latch circuit after outputting of the pulse signal is stopped.

(2) The electronic control device according to (1) above may further include an AND circuit that calculates a logical product of the first output enable signal outputted from the latch circuit and a second output enable signal outputted from the processing unit, and outputs a signal indicating the calculation result as a final output enable signal. The processing unit may carry out the failure diagnosis of the watch dog timer on the basis of the output enable signal outputted from the AND circuit and the first output enable signal outputted from the latch circuit after output of the pulse signal is stopped.

(3) The electronic control device according to (1) above may further include an AND circuit that calculates a logical product of the first output enable signal outputted from the latch circuit and a second output enable signal outputted from the processing unit, and outputs a signal indicating the calculation result as a final output enable signal, and a three-state buffer disposed between the processing unit and an output interface and outputting the output signal from the processing unit to the output interface according to the output enable signal outputted from the AND circuit. The processing unit may carry out the failure diagnosis of the watch dog timer on the basis of the output signal outputted from the three-state buffer and the first output enable signal outputted from the latch circuit after the output of the pulse signal is stopped.

(4) In the electronic control device according to (1) above, the latch circuit may reset in response to input of any one of a reset signal and a startup factor signal for the processing unit.

(5) In the electronic control device according to (2) above, the latch circuit may reset in response to input of any one of a reset signal and a startup factor signal for the processing unit.

(6) In the electronic control device according to (3) above, the latch circuit may reset in response to input of any one of a reset signal and a startup factor signal for the processing unit.

(7) A second aspect of the present invention provides a vehicle control system for use in a vehicle having a motor as a power source, which includes: a high-voltage battery for driving a motor; a connection-destination switching unit that switches a connection destination of the high-voltage battery; and the electronic control device according to any one of (1) to (6) above that controls charge and discharge of the high-voltage battery by controlling the connection-destination switching unit to switch the connection destination of the high-voltage battery.

DETAILED DESCRIPTION OF THE INVENTION

Hereinbelow, an embodiment of the present invention will be described with reference to the drawings.

Figure 1:
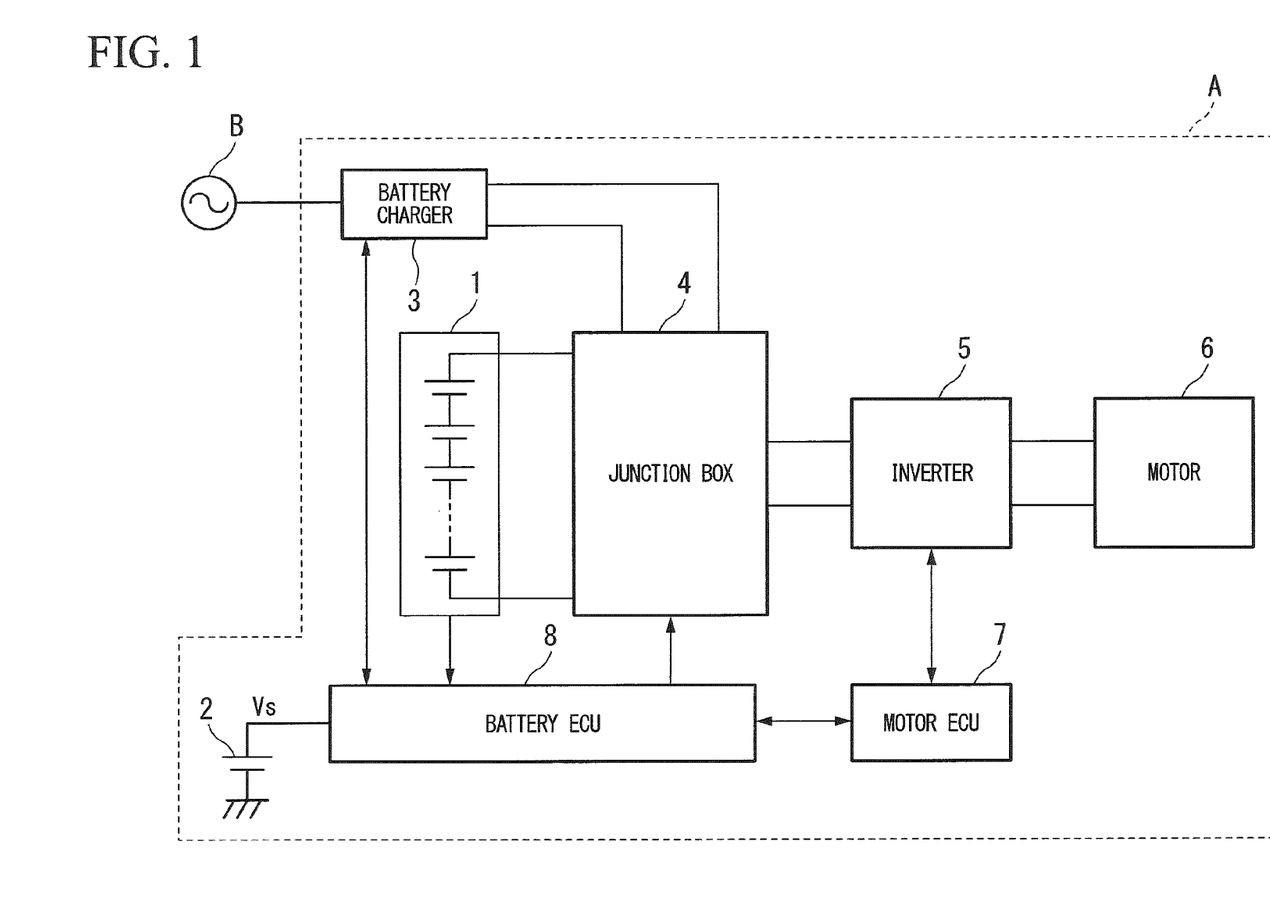
FIG. 1 is a schematic view illustrating a configuration of a vehicle control system A according to an embodiment of the present invention.

FIG. 1 is a schematic view illustrating a configuration of a vehicle control system A according to an embodiment of the present invention. This vehicle control system A is provided, for example, to an electric car, plug-in hybrid car or other vehicles having a motor as a power source, and mainly controls the motor, and charge/discharge of a high-voltage battery. The vehicle control system A includes a high-voltage battery 1, a low-voltage battery 2, a battery charger 3, a junction box 4, an inverter 5, a motor 6, a motor electric control unit (ECU) 7, and a battery ECU 8.

The high-voltage battery 1 is formed by plural battery cells such as lithium battery cells and nickel-metal hydride cells connected in series to each other. The high-voltage battery 1 is, for example, a battery for driving a motor, which outputs high DC voltage, for example, of several hundreds volts. This high-voltage battery 1 has two terminals (positive terminal and negative terminal) each connected to the junction box 4. The low-voltage battery 2 is provided for supplying a system power supply voltage Vs (for example, 12 volts) to the battery ECU 8.

The battery charger 3 is a charging circuit connected to an AC power supply B disposed externally to the vehicle at the time of charging the high-voltage battery 1. Under the control by the battery ECU 8, the battery charger 3 converts AC voltage supplied from an AC power supply B into a DC voltage with a predetermined voltage value, and outputs the DC voltage to the junction box 4.

Under the control by the battery ECU 8, the junction box 4 (connection-destination switching unit) switches the connection destination of both terminals of the high-voltage battery 1 into both output terminals of the battery charger 3 at the time of charging whereas switching them into both input terminals of the inverter 5 at the time of discharging (at the time of driving the motor 6).

The inverter 5 operates switching according to pulse width modulation (PWM) signals inputted from the motor ECU 7, and converts a high DC voltage inputted from the high-voltage battery 1 through the junction box 4 into an AC voltage with a predetermined frequency, thereby outputting the AC voltage to the motor 6. The motor 6 is, for example, a three-phase brushless motor used as the power source of the vehicle, and rotates according to the AC voltage supplied from the inverter 5.

The motor ECU 7 is connected to the battery ECU 8 in a manner that can communicate with each other. Upon receiving a request from the battery ECU 8 to drive the motor 6 (upon the connection destination of the high-voltage battery 1 being switched into the inverter 5), the motor ECU 7 generates a PWM signal to be supplied to the inverter 5. Note that the motor ECU 7 is connected to a higher-order ECU (not illustrated) in a manner that can communicate with each other, and changes a duty ratio and frequency of the PWM signal according to driving information (for example, the amount of accelerator operated) sent from the higher-order ECU to control the rotation state of the motor 6.

The battery ECU 8 is an electronic control device that controls charge and discharge of the high-voltage battery 1, and controls the junction box 4 to switch the connection destination of the high-voltage battery 1 into the battery charger 3 at the time of charging, and into the inverter 5 at the time of discharging. This battery ECU 8 controls the battery charger 3 while monitoring the voltage state of the high-voltage battery 1 at the time of charging the high-voltage battery 1, thereby charging the high-voltage battery 1 to have an appropriate voltage value.

Figure 2:
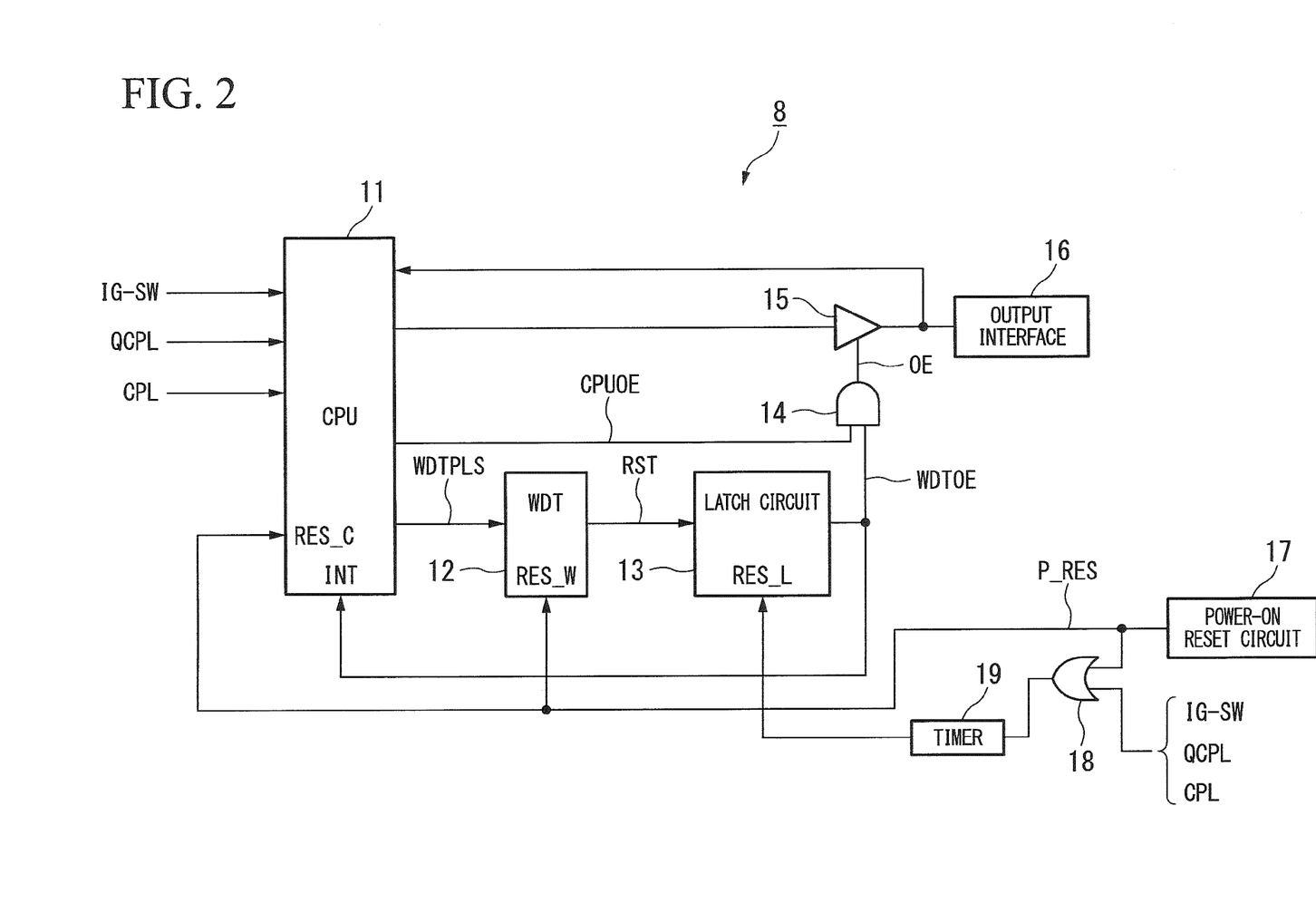
FIG. 2 is a block configuration view of a battery ECU 8 according to the embodiment of the present invention.

FIG. 2 is a block configuration diagram of the battery ECU 8. As illustrated in FIG. 2, the battery ECU 8 includes a CPU 11, a watch dog timer (WDT) 12, a latch circuit 13, an AND circuit 14, a three-state buffer 15, an output interface 16, a power-on reset circuit 17, an OR circuit 18, and a timer 19.

The CPU 11 (processing unit) is a central processing unit that carries out processes necessary for controlling the charge and discharge of the high-voltage battery 1 in accordance with a control program stored in a non-volatile memory (not illustrated). More specifically, the CPU 11 controls the battery charger 3 and the junction box 4, and sends a request for the motor ECU 7 to drive the motor 6.

Further, the CPU 11 outputs signals obtained by various processes through the three-state buffer 15 to the output interface 16. The CPU 11 outputs a WDT pulse signal WDTPLS at certain intervals to the WDT 12, and outputs, to the AND circuit 14, a CPU output enable signal CPUOE (second output enable signal) having two states, an output prohibiting level (for example, high level) and an output permitting level (for example, low level).

As will be described later, the CPU 11 receives a WDT output enable signal WDTOE outputted from the latch circuit 13 as an interrupt signal, and receives an output signal from the three-state buffer 15. The CPU 11 carries out a failure diagnosis of the WDT 12 on the basis of the interrupt signals (WDT output enable signal WDTOE) and the output signal from the three-state buffer 15.

Further, the CPU 11 has a function of transition to the sleep mode, which is an energy saving state, and switches into any one of the sleep mode and the normal operation state according to occurrence status of startup factor (states of each startup factor signal). Note that, as the startup factor signals, the CPU 11 receives, from the outside thereof, a first startup factor signal IG-SW indicating ON/OFF states of an ignition switch, a second startup factor signal QCPL indicating ON/OFF states of a rapid charging switch, and a third startup factor signal CPL indicating ON/OFF states of a normal charging switch.

The WDT 12 serves as a hardware timer used for monitoring states of the CPU 11. The WDT 12 has a time counter that resets in response to the WDT pulse signal WDTPLS inputted from the CPU 11 at certain intervals. This time counter keeps counting up even after the CPU 11 stops outputting the WDT pulse signal WDTPLS to the WDT 12, and overflows after the elapse of a certain period of time. As an overflow reset signal RST, the WDT 12 outputs, to the latch circuit 13, a signal having a level inverted according to the existence or absence of overflow occurrence. More specifically, when the overflow occurs, the WDT 12 inverts the level of the overflow reset signal RST from the high level to the low level only during a certain period of time.

The latch circuit 13 latches the overflow reset signal RST outputted from the WDT 12, and outputs the resulting signal to an interrupt terminal INT of CPU 11 and the AND circuit 14 as a WDT output enable signal WDTOE (first output enable signal). Note that the WDT output enable signal WDTOE is a signal having two states, an output prohibiting level (for example, high level) and an output permitting level (for example, low level), as is the case with the CPU output enable signal CPUOE.

The AND circuit 14 calculates a logical product of the WDT output enable signal WDTOE received from the latch circuit 13 and the CPU output enable signal CPUOE received from the CPU 11, and outputs a signal indicating the calculation results to a control terminal of the three-state buffer 15 as the final output enable signal OE. The three-state buffer 15 is disposed between the CPU 11 and the output interface 16, and outputs the output signal received from the CPU 11 to the output interface 16 according to the output enable signal OE received at the control terminal of the three-state buffer 15 from the AND circuit 14.

More specifically, if the output enable signal OE is in the output permitting level, the three-state buffer 15 outputs the output signal from the CPU 11 to the output interface 16 without any modification. If the output enable signal OE is in the output prohibiting level, the three-state buffer 15 makes the output terminals in the high impedance state to stop its output. In other words, if the output enable signal OE is in the output permitting level, the output from the three-state buffer 15 is in the output permitting level, whereas, if the output enable signal OE is in the output prohibiting level, the output from the three-state buffer 15 is in the output prohibiting level.

The output interface 16 is a communication interface that transmits the output signal from the CPU 11 (output signal from the three-state buffer 15) to an externally provided unit that is connected to the battery ECU 8. At the time of start of application of electric power to the battery ECU 8, the power-on reset circuit 17 outputs a power-on reset signal P_RES indicating a low level until the power supply voltage VBU reaches the predetermined voltage VBU_th that ensures the CPU 11 operates normally, and a high level after the power supply voltage VBU reaches the predetermined voltage VBU_th, to a reset terminal RES_C of the CPU 11, a reset terminal RES_W of the WDT 12 and the OR circuit 18.

In other words, at the time of start of application of electric power to the battery ECU 8, the CPU 11 and the WDT 12 maintain the reset state until the power supply voltage VBU reaches the predetermined voltage VBU_th.

The OR circuit 18 calculates a logical sum of the power-on reset signal P_RES inputted from the power-on reset circuit 17 and each of the startup factor signals (IG-SW, QCPL, CPL) inputted from the outside, and outputs a signal indicating the calculation results through the timer 19 to a reset terminal RES_L of the latch circuit 13. The timer 19 delays, by a predetermined period of time, outputting the output signal from the OR circuit 18 to the reset terminal RES_L of the latch circuit 13.

More specifically, the latch circuit 13 resets upon input of any one of the power-on reset signal P_RES and the startup factor signals (IG-SW, QCPL, CPL) for the CPU 11, and is released from the reset state later than the CPU 11 and the WDT 12 by the predetermined period of time.

Next, operations of the battery ECU 8 having a configuration as described above will be described in detail with reference to FIG. 3 and FIG. 4.

Figure 3:
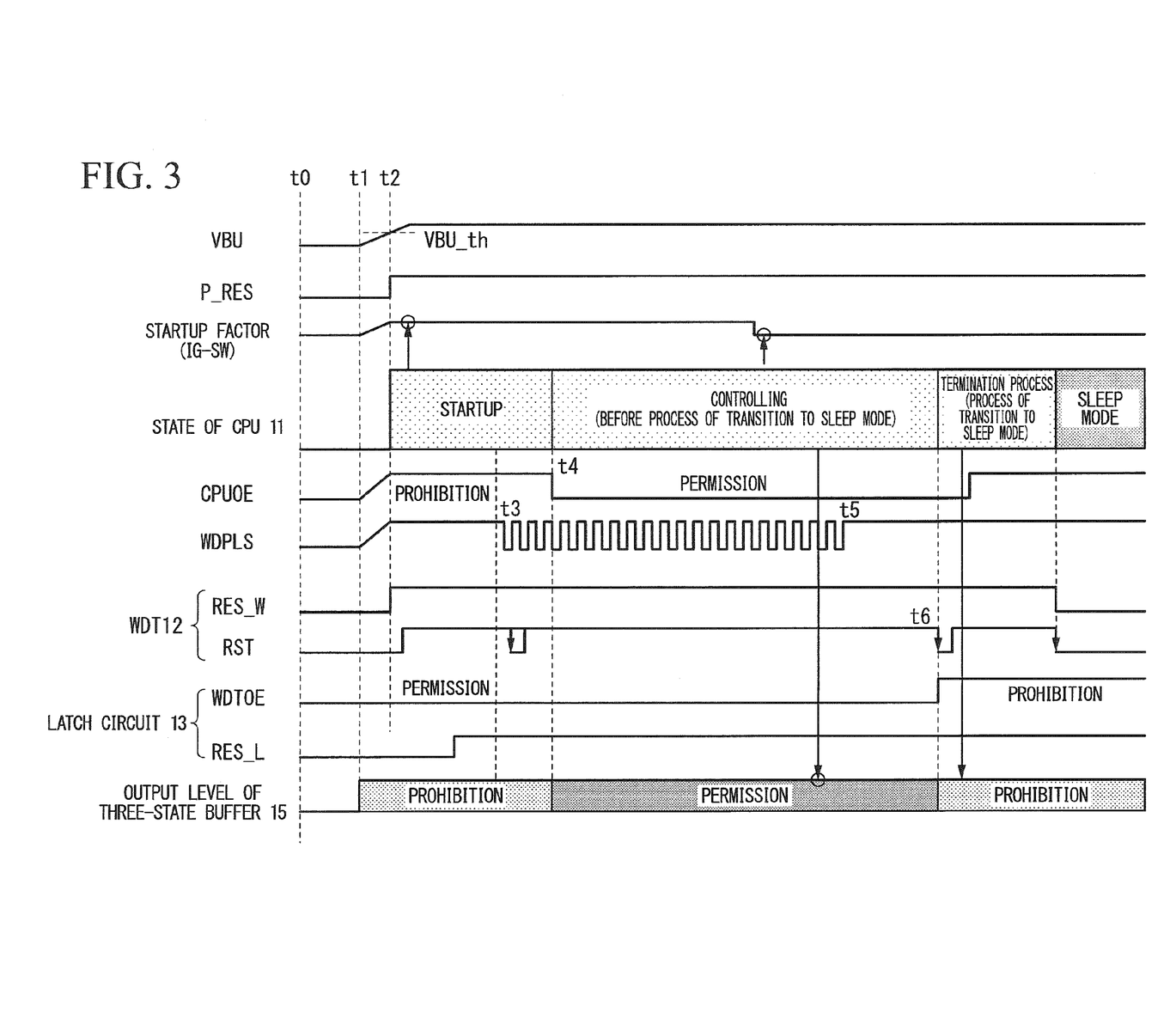
FIG. 3 is a timing chart showing operations of the battery ECU 8.

FIG. 3 is a timing chart showing a relationship in terms of time between the power supply voltage VBU, the power-on reset signal P_RES, the first startup factor signal IG-SW, the state of the CPU 11, the CPU output enable signal CPUOE, the WDT pulse signal WDTPLS, the electric potential of the reset terminal RES_W of the WDT 12, the overflow reset signal RST, the WDT output enable signal WDTOE, the electric potential of the reset terminal RES_L of the latch circuit 13, and the output level of the three-state buffer 15.

Between time t0 and t1 in FIG. 3, it is assumed that the power supply voltage VBU is not supplied to the battery ECU 8 and the CPU 11 is in the sleep mode. An electric power is applied at time t1, and then, the power supply voltage VBU gradually increases for a predetermined time period up to the maximum voltage. Assuming that the application of power supply is caused by turning-on of the ignition switch, the first startup factor signal IG-SW rises from time t1 toward the high level. However, the power-on reset signal P_RES remains in the low level until time t2 when the power supply voltage VBU reaches the predetermined voltage VBU_th. Thus, the CPU 11 remains in the reset state between time t1 and time t2.

Further, the electric potential of the reset terminal RES_W of the WDT 12 and the electric potential of the reset terminal RES_L of the latch circuit 13 remain in the low level between time t1 and time t2. Thus, the time counter of WDT 12 resets and the latch circuit 13 resets.

When the power supply voltage VBU reaches the predetermined voltage VBU_th at time t2, the power-on reset signal P_RES changes into the high level, and then, the CPU 11 and the WDT 12 are released from the reset state. Note that the latch circuit 13 is released from the reset state later than the CPU 11 and the WDT 12 by a predetermined time period (see the electric potential of the reset terminal RES_L of the latch circuit 13).

When the reset state is released at time t2, the CPU 11 starts up from the sleep mode to start to output the WDT pulse signal WDTPLS to the WDT 12 from time t3 at certain intervals, whereas the CPU 11 changes the CPU output enable signal CPUOE, which has been set to the output prohibiting level (high level) since time t2, into the output permitting level (low level) at time t4 which is later than time t3 and at which the CPU 11 completes startup and fully shifts into the normal operation mode.

During the time when the WDT pulse signal WDTPLS is being outputted to the WDT 12 after time t3, the time counter of the WDT 12 is normally reset and overflow does not occur. Thus, the overflow reset signal RST outputted from the WDT 12 is maintained to be in the high level. During this time, the WDT output enable signal WDTOE outputted from the latch circuit 13 is maintained to be in the output permitting level (low level).

More specifically, after time t4, both the CPU output enable signal CPUOE outputted from the CPU 11 and the WDT output enable signal WDTOE outputted from the latch circuit 13 are in the output permitting level. Thus, the output enable signal OE outputted from the AND circuit 14 is in the output permitting level. This makes the output level of the three-state buffer 15 in the output permitting level.

During the normal operation, the CPU 11 keeps outputting the WDT pulse signal WDTPLS to the WDT 12, whereby the output level of the three-state buffer 15 remains in the output permitting level, provided that the WDT 12 operates normally. Thus, the CPU 11 can output signals obtained through various processing performed in accordance with control programs, through the output interface 16 to external units without causing any problems.

Assuming that the CPU 11 runaway occurs, and the output of the WDT pulse signal WDTPLS to the WDT 12 stops after time t5. The time counter of the WDT 12 keeps counting up even after the output of the WDT pulse signal WDTPLS stops, and overflow occurs after the elapse of a predetermined time period. If the overflow occurs at time t6, the WDT 12 inverts the level of the overflow reset signal RST from the high level to the low level at time t6 only during a predetermined period of time.

Then, the latch circuit 13 uses as a trigger the change in the level of the overflow reset signal RST as described above to latch the overflow reset signal RST. With this operation, at time t6, the WDT output enable signal WDTOE outputted from the latch circuit 13 is inverts into the output prohibiting level (high level). The WDT output enable signal WDTOE is inputted into the interrupt terminal INT of the CPU 11, and then, the CPU 11 determines whether the overflow occurs in the WDT 12 on the basis of the WDT output enable signal WDTOE inputted into the interrupt terminal INT.

If determining that the overflow occurs in the WDT 12 on the basis of the WDT output enable signal WDTOE, the CPU 11 inverts the level of the CPU output enable signal CPUOE to be in the output prohibiting level (high level). As a result, both the CPU output enable signal CPUOE outputted from the CPU 11 and the WDT output enable signal WDTOE outputted from the latch circuit 13 are in the output prohibiting level after time t6, which makes the output enable signal OE outputted from the AND circuit 14 in the output prohibiting level. Further, the output level from the three-state buffer 15 also becomes the output prohibiting level.

More specifically, at the time when the CPU 11 runaway occurs, a signal transmission from the three-state buffer 15 to the output interface 16 is blocked, so that it is possible to prevent abnormal signals from being outputted through the output interface 16 to the external devices.

As described above, in the case where the output of the WDT pulse signal WDTPLS from the CPU 11 to the WDT 12 stops when the WDT 12 operates normally, all the output levels of the WDT output enable signal WDTOE, the CPU output enable signal CPUOE, the output enable signal OE and the three-state buffer 15 are in the output prohibiting levels. With this configuration, it is possible to carry out the failure diagnosis of the WDT 12 with the methods described below.

Figure 4:
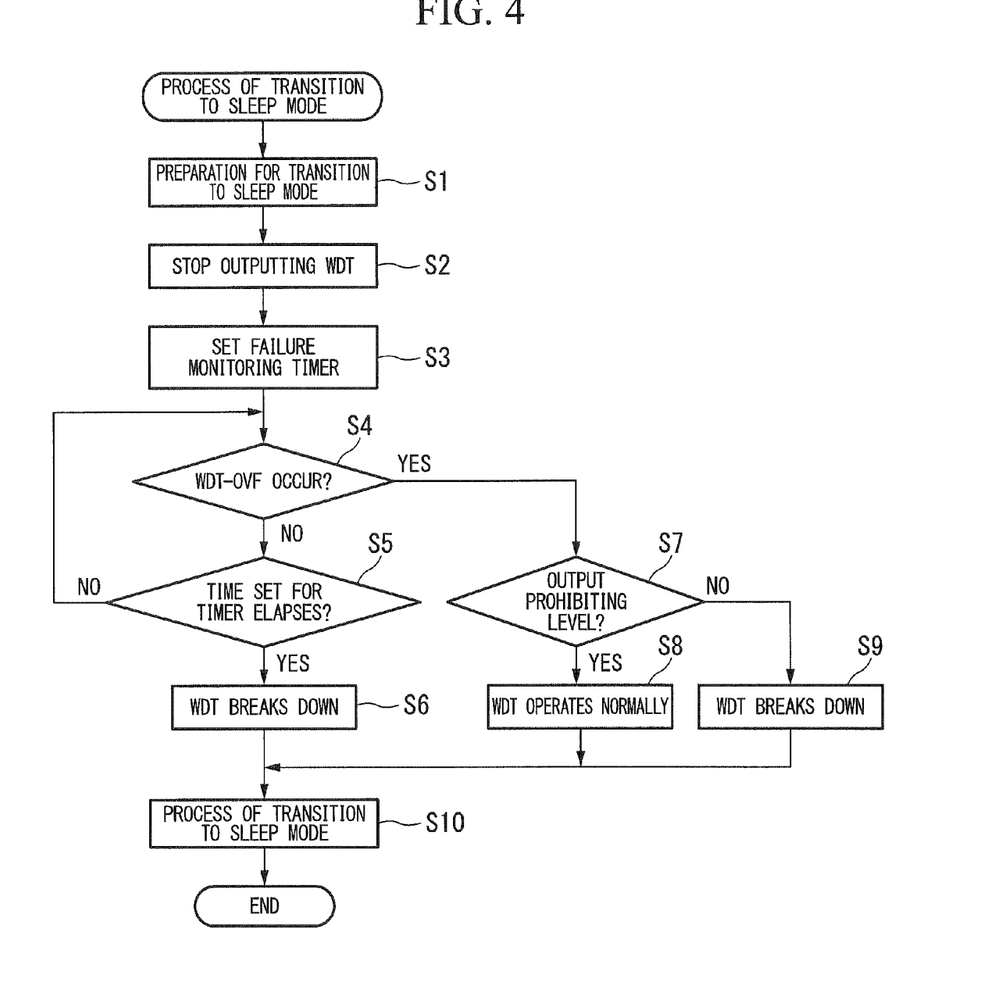
FIG. 4 is a flowchart showing a failure diagnosis process for a WDT 12 performed by a CPU 11 before transition to a sleep mode.

If detecting any startup factor vanishing (for example, the first startup factor signal IG-SW becomes the low level) during the normal operation (time period after time t4 in FIG. 3), the CPU 11 performs a process of transition to the sleep mode in accordance with a flowchart shown in FIG. 4 to carry out the failure diagnosis of the WDT 12 in the process of transition to the sleep mode.

As shown in FIG. 4, upon detecting the startup factor vanishing and starting the process of transition to the sleep mode, the CPU 11 first makes a preparation for transition to the sleep mode such as shunt of register (step S1). Then, the output of the WDT pulse signal WDTPLS to the WDT 12 is stopped (step S2), and a failure monitoring timer, which is a software timer, is set (step S3). The setting time for the failure monitoring timer is desirable to be set at least to a time period between time t5 and time t6 in FIG. 3, more specifically, to a time period from a time when the output of the WDT pulse signal WDTPLS to the WDT 12 is stopped to a time when the overflow occurs in the WDT 12.

Then, the CPU 11 determines whether the overflow occurs in the WDT 12 on the basis of the level of the WDT output enable signal WDTOE inputted into the interrupt terminal INT (step S4).

If step S4 indicates "No" (it is determined that the WDT output enable signal WDTOE is in the output permitting level and the overflow does not occur), the CPU 11 determines whether or not the setting time set for the failure monitoring timer elapses (step S5).

If step S5 indicates "No," the CPU 11 returns to a process of step S4. On the other hand, if step S5 indicates "Yes" (although the output of the WDT pulse signal WDTPLS to the WDT 12 is stopped, the overflow does not occur even if the setting time for the failure monitoring time elapses), the CPU 11 determines that the WDT 12 breaks down (step S6).

Further, if step S4 indicates "Yes" (the overflow occurs within the setting time for the failure monitoring timer after the output of the WDT pulse signal WDTPLS is stopped), the CPU 11 determines whether the output level of the three-state buffer 15 is in the output prohibiting level (step S7). As described above, if the WDT 12 operates normally, the output level of the three-state buffer 15 should be in the output prohibiting level after the output of the WDT pulse signal WDTPLS is stopped.

Thus, if step S7 indicates "Yes" (the output level of the three-state buffer 15 is in the output prohibiting level), the CPU 11 determines that the WDT 12 operates normally (step S8). On the other hand, if step S7 indicates "No" (the output level of the three-state buffer 15 is in the output permitting level), the CPU 11 determines that the WDT 12 breaks down (step S9).

After determining that the WDT 12 operates normally or breaks down in step S6, S8 or S9, the CPU 11 stores the results of the failure diagnosis in a memory, and then transitions to the sleep mode as illustrated in FIG. 3 (step S10).

As described above, according to this embodiment, the CPU 11 having a function of transition to the sleep mode carries out the failure diagnosis of the WDT 12 before transition to the sleep mode. This makes it possible to carry out the failure diagnosis of the WDT 12 without causing delay in starting up the CPU 11, this delay being seen in the conventional art.

It should be noted that the present invention is not limited to the embodiment above, and various modification as described below may be possible.

(1) In the embodiment described above, the process of step S7 in FIG. 4 includes determining whether or not the output level of the three-state buffer 15 is in the output prohibiting level, as an example. However, it may be possible to employ a configuration in which step S7 includes determining whether or not the output enable signal OE is in the output prohibiting level, because the output enable signal OE outputted from the AND circuit 14 is in the output prohibiting level if the WDT 12 operates normally, as described above.

(2) In the embodiment described above, it is determined whether the overflow occurs within the predetermined time period after the output of the WDT pulse signal WDTPLS to the WDT 12 is stopped, and if the overflow occurs, it is determined whether the output level of the three-state buffer 15 is in the output prohibiting level to carry out the failure diagnosis of the WDT 12. However, it may be possible to employ a configuration in which the failure diagnosis of the WDT 12 is carried out only by determining whether the overflow occurs in the WDT 12 within the predetermined time period after the output of the WDT pulse signal WDTPLS to the WDT 12 is stopped.

In this case, if the overflow occurs within the predetermined time period after the output of the WDT pulse signal WDTPLS to the WDT 12 is stopped, it is determined that the WDT 12 operates normally, whereas, if the overflow does not occur within the predetermined time period, it is determined that the WDT 12 breaks down.

(3) In the embodiment described above, a description has been made, as an example of the electronic control device according to the present invention, of the battery ECU 8 that controls charge and discharge of the high-voltage battery 1 for use in an electric car, a plug-in hybrid car or other vehicle that uses a motor as a power source. However, the present invention is not limited to this, and may be extensively applied to electronic control devices including a processing unit having the function of transition to the sleep mode, and a watch dog timer having a time counter that resets in response to a pulse signal outputted from the processing unit at certain intervals, the watch dog timer outputting a signal having a level inverted according to existence or absence of the occurrence of overflow.

(4) In the embodiment above, a description has been made, as an example, of the vehicle control system A for use in an electric car, a plug-in hybrid car or other vehicle having the high-voltage battery 1 capable of being charged from the outside. However, the present invention is not limited to this. The present invention may be applied to a vehicle control system provided to a hybrid car or other vehicle including an engine and a motor as a power source and having the high-voltage battery 1 that cannot be charged from the outside.

Figure 5:
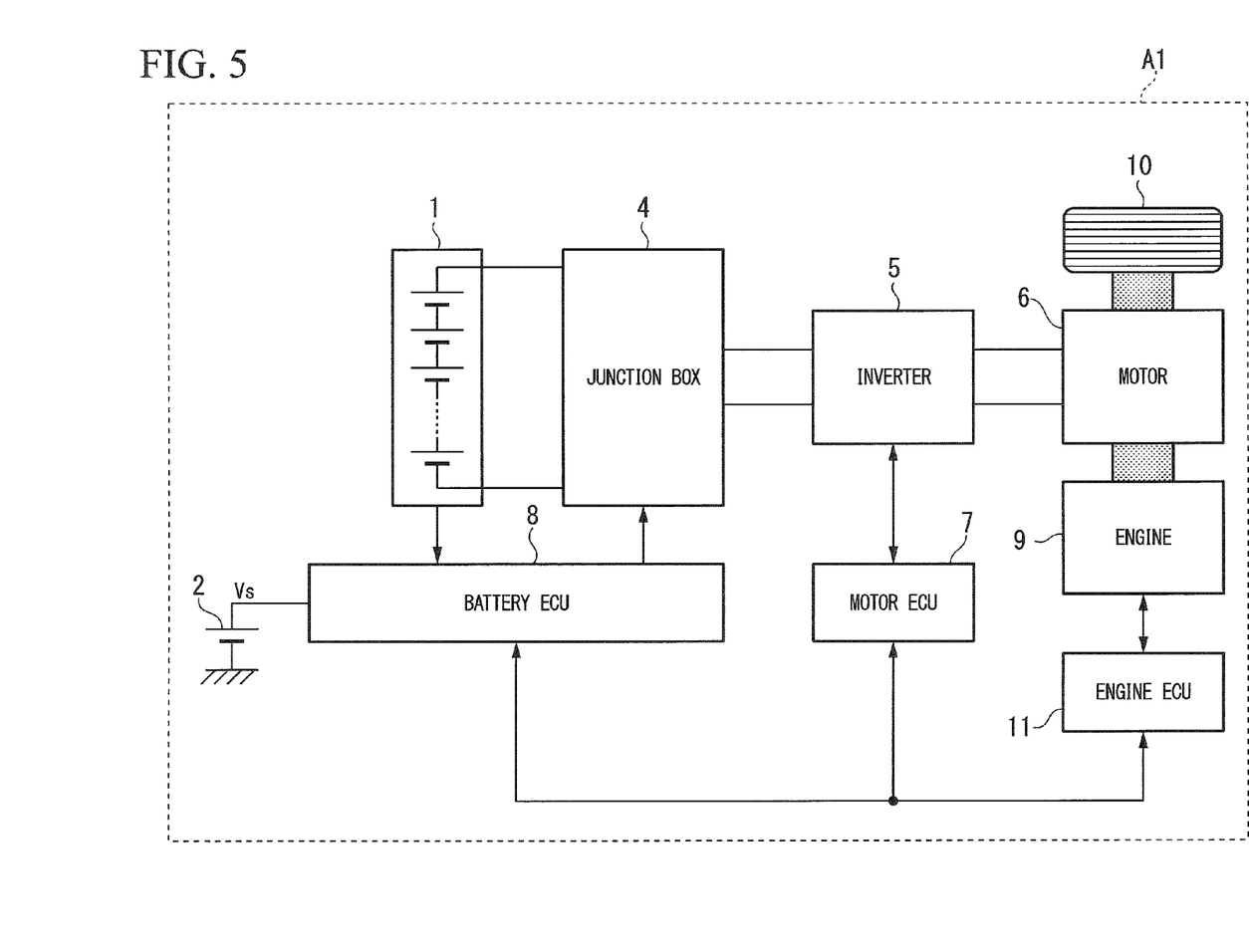
FIG. 5 is a modification example of the vehicle control system A according to the embodiment of the present invention.

FIG. 5 is a configuration schematic view illustrating an example of the vehicle control system A1 for use in a hybrid car. In FIG. 5, the constituent elements same as those of the vehicle control system A are denoted by the same reference characters. As illustrated in FIG. 5, the vehicle control system A1 is a hybrid system employing a parallel system in which the motor 6 and an engine 9 are linked to each other on the same axis, and both of the motor 6 and the engine 9 are used as the power source for a wheel 10. Note that the vehicle control system A1 may be a hybrid system employing a system other than the parallel system.

An engine ECU 11 is provided to control the engine 9 in terms, for example, of the amount of fuel to inject, the timing of fuel injection, and the ignition timing. The engine ECU 11 is connected to the motor ECU 7 and the battery ECU 8 in a manner that they can communicate with each other. The engine ECU 11, the motor ECU 7, and the battery ECU 8 share information with each other to realize the travel of the vehicle in a manner that the motor 6 and the engine 9 are controlled in a cooperative manner.

What is claimed is:

1. An electronic control device comprising:
    a processing unit having a function of transition to a sleep mode;
    a watch dog timer having a time counter that resets in response to a pulse signal outputted from the processing unit at certain intervals, the watch dog timer outputting a signal having a level inverted according to existence or absence of overflow occurrence,
    a latch circuit that latches the signal outputted from the watch dog timer and outputs a signal obtained through the latching as a first output enable signal, and
    an AND circuit that calculates a logical product of the first output enable signal outputted from the latch circuit and a second output enable signal outputted from the processing unit, a level of the second output enable signal being inverted when the processing unit completes startup and an overflow occurs and during the processing unit performing a process of transition to the sleep mode, and that outputs a signal indicating a calculation result as a final output enable signal;
    wherein the processing unit stops outputting the pulse signal before transition to the sleep mode, and carries out failure diagnosis of the watch dog timer based on the final output enable signal outputted from the AND circuit and the first output enable signal outputted from the latch circuit after output of the pulse signal is stopped.

2. The electronic control device according to claim 1, further comprising:
    an AND circuit that calculates a logical product of the first output enable signal outputted from the latch circuit and a second output enable signal outputted from the processing unit, and outputs a signal indicating a calculation result as a final output enable signal; and
    a three-state buffer disposed between the processing unit and an output interface, the three-state buffer outputting the output signal from the processing unit to the output interface according to the final output enable signal outputted from the AND circuit, wherein
    the processing unit carries out the failure diagnosis of the watch dog timer based on an output signal outputted from the three-state buffer and the first output enable signal outputted from the latch circuit after output of the pulse signal is stopped.

3. The electronic control device according to claim 1, wherein
    the latch circuit resets in response to input of any one of a reset signal and a startup factor signal for the processing unit.

4. The electronic control device according to claim 2, wherein
    the latch circuit resets in response to input of any one of a reset signal and a startup factor signal for the processing unit.

5. A vehicle control system for use in a vehicle having a motor as a power source, the system comprising:
    a high-voltage battery for driving the motor;
    a connection-destination switching unit that switches a connection destination of the high-voltage battery; and
    an electronic control device structured to control charge and discharge of the high-voltage battery by controlling the connection-destination switching unit to switch the connection destination of the high-voltage battery, the electronic control device comprising:
        a processing unit having a function of transition to a sleep mode;
        a watch dog timer having a time counter that resets in response to a pulse signal outputted from the processing unit at certain intervals, the watch dog timer outputting a signal having a level inverted according to existence or absence of overflow occurrence,
        a latch circuit that latches the signal outputted from the watch dog timer and outputs a signal obtained through the latching as a first output enable signal, and
        an AND circuit that calculates a logical product of the first output enable signal outputted from the latch circuit and a second output enable signal outputted from the processing unit, a level of the second output enable signal being inverted when the processing unit completes startup and an overflow occurs and during the processing unit performing a process of transition to the sleep mode, and that outputs a signal indicating a calculation result as a final output enable signal;
        wherein the processing unit stops outputting the pulse signal before transition to the sleep mode, and carries out failure diagnosis of the watch dog timer based on the final output enable signal outputted from the AND circuit and the first output enable signal outputted from the latch circuit after output of the pulse signal is stopped.

* * * * *